July 31, 1951     D. B. GARDINER     2,562,353
VENT VALVE FOR POWER TRANSMISSIONS
Filed May 24, 1946
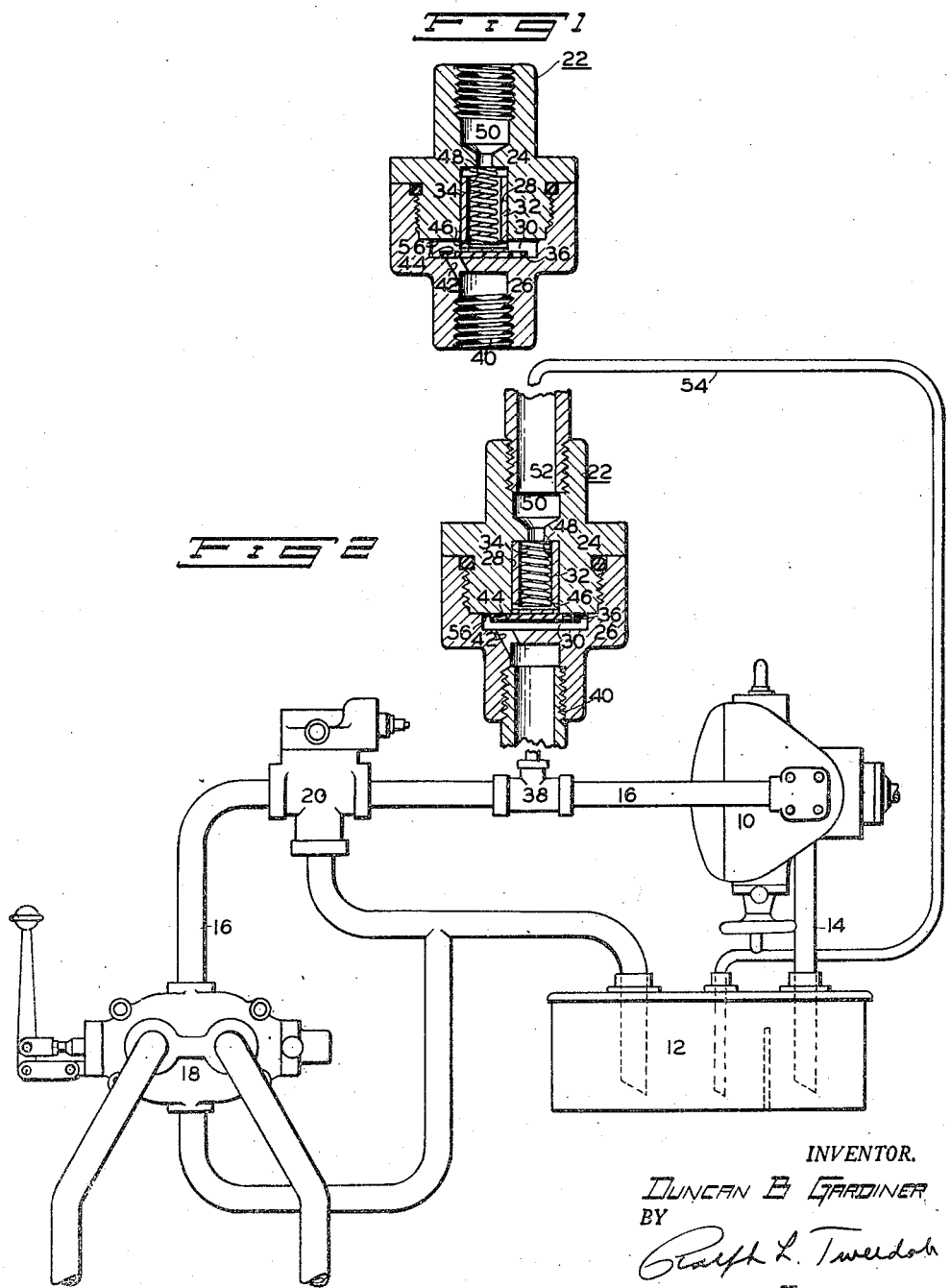
INVENTOR.
DUNCAN B GARDINER
BY
Ralph L. Tweedoh
ATTORNEY Patented July 31, 1951

2,562,353

UNITED STATES PATENT OFFICE 2,562,353

VENT VALVE FOR POWER TRANSMISSIONS

Duncan B. Gardiner, Detroit, Mich., assignor to Vickers Incorporated, Detroit, Mich., a corporation of Michigan Application May 24, 1946, Serial No. 671,972

4 Claims. (Cl. 251—144)

This invention relates to power transmissions, particularly to those of the type comprising two or more fluid pressure energy translating devices, one of which may function as a pump and another as a fluid motor.

The special purpose of the device is to provide means for venting hydraulic transmissions. Due to the compressible characteristic of air, when a hydraulic transmission is started, the pump may compress the air slightly but not enough to drive the motor by air pressure alone. Therefore, when such a condition exists, the air pressure in the system may rise but is unable to exhaust itself. At the same time, the air pressure in the pump cylinders, being above atmospheric, will not exhaust the air from the suction line, and consequently the system is not automatically self-priming.

As a general rule, all air should be removed from a hydraulic system for highest efficiency. Smoother running can be accomplished by eliminating air pockets and cavitation which normally cause excessive noise and wear when present.

Therefore, the main object of this invention is to provide means for automatically eliminating air from a hydraulic transmission.

Another object is to provide a vent valve designed for normally opening at low pressures and sealing tightly at all higher pressures.

A further object is to provide a piston-type vent valve having adequate clearance for free action in combination with automatic means for sealing the clearances under pressure.

Still another object is to provide a hydraulic transmission vent valve of economic design and adapted to produce accurate automatic action during its long life.

Further objects and advantages of the present invention will be apparent from the following description, reference being had to the accompanying drawing wherein a preferred form of the present invention is clearly shown.

In the drawing:

Figure 1 is an elevation in section of the vent valve shown in its open position.

Figure 2 is a hydraulic circuit diagram employing a vent valve in enlarged section showing the valve in its closed position.

In Figure 2, a fluid pressure system is shown which comprises a pump 10 connected to a supply tank 12 by a suction conduit 14 and provided with a pressure conduit 16 connected to a hydraulic load device (not shown) through four-way valve 18. In the pressure line or conduit 16, a relief valve 20 and a vent valve 22 are located.

The vent valve 22 includes upper and lower body members 24 and 26, respectively, enclosing a cylinder 28 and pressure chamber 30. A piston outlet valve 32 is reciprocably mounted in the cylinder 28 and is urged downward as illustrated in the drawing, into its open position, by the spring 34 until it rests against the diaphragm seal 36. Pressure from the system enters the vent valve 22 by means of the T 38, the tapped connection 40 and the diagonal passage 42 which connects to the pressure chamber 30 at a point external the projection of the outlet valve 32 on the diaphragm 36. Passages 44 in the diaphragm 36 are located external of the projection of the outlet valve 32 on the diaphragm 36. The bottom end of the piston valve 32 projects beyond the end of the cylinder walls 28 and into the pressure chamber 30. The piston outlet valve 32 is hollow and is provided with radial passages 46 located in that portion of the piston projecting beyond the cylinder 32. The passages 46 extend from the periphery of valve 32 to the central bore 48. The flow path area of the passages 46 is preselected so that while they offer substantially no restriction to air flow, they do create a resistance to liquid flow.

In operation, when the pump 10 is started, suction from the tank 12 may be or may not be established according to whether air is entrapped in the pressure conduit 16. Initially, the pump 10 will deliver some air at pressures above atmospheric. In the system shown in Figure 2, the air will be immediately discharged through the T 38, connection 40, diagonal passage 42, pressure chamber 30, around or under the diaphragm 36 (Figure 1), through the passages 46, hollow piston bore 48, passage 50, fitting 52, return conduit 54, to the tank 12.

As the pressure in the system rises, the piston valve 32 is raised which closes radial passages or ports 46 in the lower piston wall and closes the valve against further venting until the pressure in the system drops to the point selected for venting.

Due to the fact that the passages 46 offer much less resistance to air flow than to liquid flow, the pressure below the diaphragm on the face area thereof will be low. The resistance of the spring 34 is correlated with the flow area of the passages 46 in the valve 32. The relationship between them is such that when liquid starts to flow through the passages 46, the latter create a resistance to the liquid flow causing an increase in pressure sufficient to overcome the resistance of the spring 34. The diaphragm 36 is shifted upwardly and the valve 32 shifts therewith, thereby closing the ports 46 to communication with the chamber 30.

The operation of the valve from venting position to closing position when liquid attempts to flow through passages 46 is very fast. Repeated tests of the venting valve offers proof of this statement in showing that only a minute quantity of liquid is expelled through the passage 50.

Although there is no appreciable increase in the pressure drop across a flow path of a given area, such as the ports 46, over a wide range of increasing air flow, the same is not true of liquid flow through the same path. Thus, the venting valve 22 may be used in a variety of systems having fluid pumps and motors offering a wide range of displacements by the expedient of selecting ports 46 of such an area as to restrict a predetermined minimum liquid flow while allowing a much larger maximum air flow.

The diaphragm 36, although permitting air to pass freely into the chamber 30 under low pressure, performs the same function as a check valve once the pressure has increased due to liquid flow through the ports 46. Due to the fact that the diaphragm has a large pressure area, once the diaphragm has come to rest against the chamber wall or ceiling 56, the outlet passage 50 is sealed from the inlet connection 40.

Thus, the valve 36, carrying the ports 46 controls the outlet 50, and the diaphragm 36 cooperates therewith to permit air flow to the chamber 30 and through the ports 46 when the pressure is low, and seals the outlet from the inlet when liquid flow commences.

The diaphragm 36 also acts as a check valve to prevent reverse flow of air into the system in the event pressure should fall below atmospheric. Thus, it may seat on the floor of chamber 32 as shown in Figure 1, and seal the end of passage 42 against flow of air thereinto.

In order to provide free action of the piston valve 32, clearances between the valve 32 and cylinder wall 28 are too large to prevent leakage at high pressures. The diaphragm 36 is made of an elastic material and located in the pressure chamber 30 free of any fastening. As illustrated in Figure 2, the diaphragm 36 is raised with the valve 32 by fluid pressure or flow until the valve 32 is forced under pressure to its highest or closed position. Normally pressure fluid which would pass through the clearance space tends to press the diaphragm 36 tighter against the face of the valve and chamber wall, thereby providing a tight seal against all leakage.

As the pressure from the system flattens the diaphragm against the face of the valve and chamber wall or ceiling 56, it produces the characteristics of a suction cup. When the pressure in the system falls whereby the spring 34 would tend to force the valve 32 downward and project its lower portion into the chamber 30, the diaphragm 36 acting as a suction cup resists this action and will hold the valve up delaying the opening of the vent valve 22. To break the suction, passages 44 have been provided in the diaphragm 36 outside the periphery of the valve 32 which will release the vacuum without interfering with the seal against leakage through the clearance space. During experiments it was found that a vent valve spring set for 35 pounds per square inch pressure closing would seal on rising pressures at that point. Without the passage 44 it would not open on falling pressures until it reached approximately 7 pounds per square inch. By introducing passage 44, in the diaphragm 36, the closing and opening occurred at the same system pressure.

The diagonal passage 42 has been provided to overcome the obstruction of the passage which occurred when it entered the chamber 30 directly below the valve 32. The spring 34 would tend to force the diaphragm 36 across the opening and seal it. By having the passage 42 enter the chamber below the diaphragm 36 but at a point outside the periphery of the projection of the valve 32, the lower system pressures will be capable of raising the edge of the diaphragm and permit air or pressure fluid to initially enter the chamber 30 for venting the system or actuating the valve.

It will thus be seen that the present invention has provided a valve particularly suitable for exhausting air from hydraulic systems at low pressures and yet be capable of positively sealing off the system at higher pressures. This is accomplished by the use of a piston outlet valve for mechanically porting the air or fluid at low pressures, to an atmospheric tank in combination with means for sealing the piston valve clearances at high pressures.

While the form of embodiment of the invention as herein disclosed constitutes a preferred form, it is to be understood that other forms might be adopted, all coming within the scope of the claims which follow.

What is claimed is as follows:

1. A vent valve for a fluid pressure system comprising a body, a cylinder in the body, a pressure chamber at the end of the cylinder adapted to be connected to the system, a piston valve reciprocably mounted in said cylinder and projecting beyond the cylinder walls into the pressure chamber in its normally open venting position, the head of the piston being flush with the chamber wall in its closed position, an elastic element in the chamber and positioned against the head of the piston and chamber wall by the system pressure when the valve is closed for sealing the clearance between the piston and cylinder walls, the elastic element being larger than the piston area, and one or more air passages through the elastic element at a point outside the periphery of the piston and closed at one end by the chamber wall when the valve is closed.

2. A vent valve for a fluid pressure system comprising a body having a cylinder therein, a pressure chamber at one end of the cylinder, means forming an inlet port connected to the pressure chamber and adapted to be connected to the system, means forming a venting port connected to the cylinder and adapted to be connected to atmosphere, an outlet valve shiftably mounted in the cylinder and extending into the pressure chamber when the valve is in open venting position, said extending portion of the valve having a liquid flow restriction forming a means of communication between the pressure chamber and the venting port when the valve is in open venting position, means biasing the outlet valve to the open venting position, and a flexible member in the pressure chamber having a pressure effective surface area in communication with the inlet port for actuating the outlet valve to the closed position in response to increases in pressure in the pressure chamber caused by the change in resistance from air flow to liquid flow through the restriction.

3. A vent valve for a fluid pressure system comprising a body having an inlet port and a venting port, a pressure chamber connected to the inlet port, means forming a cylinder connected to the venting port and one end of which opens to the pressure chamber, a valve shiftably mounted in the cylinder having a portion extending through the opening of the cylinder into the pressure chamber when the valve is in open position, means forming a liquid flow restriction in the extended portion of the valve forming a means of communication between the pressure chamber and the venting port, means biasing the valve to the open position, and a flexible member in the pressure chamber having a pressure effective surface area connected to the inlet port, said flexible member being responsive to increases of pressure in the pressure chamber caused by the change in resistance from air flow to liquid flow through the restriction for operating the valve to the closed position into the cylinder, and said flexible member having an area larger than the cylinder opening for completely sealing the cylinder opening from communication with the pressure chamber when the valve is in the closed position.

4. A vent valve for eliminating air from a hydraulic power transmission system comprising a body having a pressure chamber adapted to be connected to the system, means forming a cylinder in the body, one end of which opens to the pressure chamber and the opposite end of which is adapted to be connected to atmosphere, a piston valve slidably mounted in the cylinder and having a portion extending into the pressure chamber when in open venting position, means forming a liquid flow restriction in the piston connecting the pressure chamber to atmosphere, resilient means biasing the piston valve to the open venting position, and a flexible diaphragm in the pressure chamber having an area larger than the cylinder opening leading to the pressure chamber, said diaphragm having a pressure effective area adapted to be connected to the system and being responsive to increases in pressure in the pressure chamber caused by the change in resistance from air flow to liquid flow for shifting the piston completely into the cylinder and for completely sealing the opening of the cylinder.

DUNCAN B. GARDINER.

REFERENCES CITED

The following references are of record in the file of this patent:

UNITED STATES PATENTS

| Number | Name | Date |
| --- | --- | --- |
| 152,179 | Shaw | June 16, 1874 |
| 1,107,284 | Gardner | Aug. 18, 1914 |
| 1,252,972 | Weaver | Jan. 8, 1918 |
| 1,609,472 | Guill | June 10, 1941 |

FOREIGN PATENTS

| Number | Country | Date |
| --- | --- | --- |
| 2,657 | Great Britain | Feb. 1, 1902 |